(12) United States Patent
McCall et al.

(10) Patent No.: US 6,317,826 B1
(45) Date of Patent: Nov. 13, 2001

(54) BOOTING A COMPUTER SYSTEM FROM A NETWORK

(75) Inventors: Colin David McCall, Glasgow; Jane Henderson Shaw, Paisley, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/174,982

(22) Filed: Oct. 19, 1998

(30) Foreign Application Priority Data

Feb. 13, 1998 (GB) .................................................. 9802974

(51) Int. Cl.[7] .............................. G06F 9/24; G06F 15/177
(52) U.S. Cl. .................................... 713/1; 713/2; 713/100
(58) Field of Search .................................. 713/1, 2, 100; 709/220, 221, 222

(56) References Cited

U.S. PATENT DOCUMENTS

| | | | |
|---|---|---|---|
| 5,577,210 | * 11/1996 | Abdous et al. | 709/219 |
| 5,732,268 | * 3/1998 | Bizzarri | 713/2 |
| 5,842,011 | * 11/1998 | Basu | 713/2 |
| 5,872,968 | * 2/1999 | Knox et al. | 713/2 |
| 6,209,089 | * 3/2001 | Selitrennikoff et al. | 713/2 |

FOREIGN PATENT DOCUMENTS

| | | | |
|---|---|---|---|
| 0 358 292 | 3/1990 | (EP) | G06F/9/445 |
| 2 311 389 | 9/1997 | (GB) | G06F/9/445 |

OTHER PUBLICATIONS

Van Wolverton, "Running MS DOS", Microsoft Press, 1991, pp. 368–386.*

* cited by examiner

*Primary Examiner*—Dennis M. Butler
(74) *Attorney, Agent, or Firm*—Ronald L. Drumheller

(57) ABSTRACT

A client computer system (10) is adapted to connect to a server (16) across a network (20). The client system includes memory (25 or a storage medium) into which an operating system is loadable. The client includes a network card (12) having a PROM (14) adapted to download a bootstrap program (17) from the server. The bootstrap program (17) is in turn adapted to load an operating system image (18) over the network from the server into a location in the memory. The client then boots from the operating system image in memory, with the client system being adapted to subsequently modify the operating system image in memory, without reloading the image over the network, and re-boot the client system.

16 Claims, 2 Drawing Sheets

BOOTING A COMPUTER SYSTEM FROM A NETWORK

FIELD OF THE INVENTION

The present invention relates to booting a computer system from a network.

BACKGROUND OF THE INVENTION

It is known for a client computer system, connected via any one of a number of commercially available network media to a server, to download a boot image from the server and boot. For example, IBMs LCCM Version 2 product, in common with many other current and imminent personal computer (PC) management and maintenance tools such as Intel's LANDesk Configuration Manager, uses the dynamic host configuration protocol (DHCP) and trivial file transfer protocol (TFTP) to load a DOS operating system as a diskette image into a virtual RAM drive in a client system's memory, and then boots from the diskette image, to perform installation and maintenance tasks.

Different client computer systems booting up using different boot images downloaded from a network require different boot images depending on the hardware configuration of the client and the function to be performed by the booted client. This requires the server to be aware of each client computer configuration and function to be performed when configuring the boot image.

Also, some tasks require that the client be re-booted one or more times in succession to perform a series of functions before proceeding. For example to partition and format a hard disk under DOS, the client must be rebooted between the partition and format stages. A second network boot entails a significant delay as well as creating additional network traffic, and requires that the server computer configuration is modified between the first and second boot stages so the client computer boots with the correct software for each stage in the correct sequence.

The Preboot Execution Environment (PXE) specification (Intel, Compaq et al) allows different network cards to operate with the same OS image, thus solving the major problem of ensuring compatibility between the booted image and the system network card.

However, many older PCs and network adapters do not implement the PXE specification, and other compatibility problems remain requiring different versions of the operating system image to be downloaded for different client systems or tasks. For example, some maintenance tasks require the presence of an Extended Memory Manager (like EMM386) while others will not operate with an Extended Memory Manager. This requires the server to be re-configured to provide the correct boot image for the task to be performed.

It is an object of the present invention to mitigate these problems.

SUMMARY OF THE INVENTION

Accordingly, the present invention provides a client computer system adapted to connect to a server across a network, the client system including memory into which an operating system is loadable and being adapted to load at least a portion of an operating system image over the network from the server into a location in said memory and boot from the operating system image in memory, wherein said client system is adapted to subsequently modify the operating system image in memory without reloading the portion of the operating system image over the network and re-boot the client system.

In a further aspect the invention provides a computer method of booting a computer in a network said method including the steps of:

a. downloading at least a portion of an operating system image from a network server b. booting the operating system c. modifying the operating system image in memory d. repeating steps b. and c.

In a still further aspect the invention provides an operating system images system image for a client computer system including a network card operable to connect said client system to a server across a network, said operating system image being operable to boot said client system, to modify itself after being booted and to re-boot said client system to connect said client system to said server.

DESCRIPTION OF THE PREFERRED EMBODIMENTS

Figure 1:
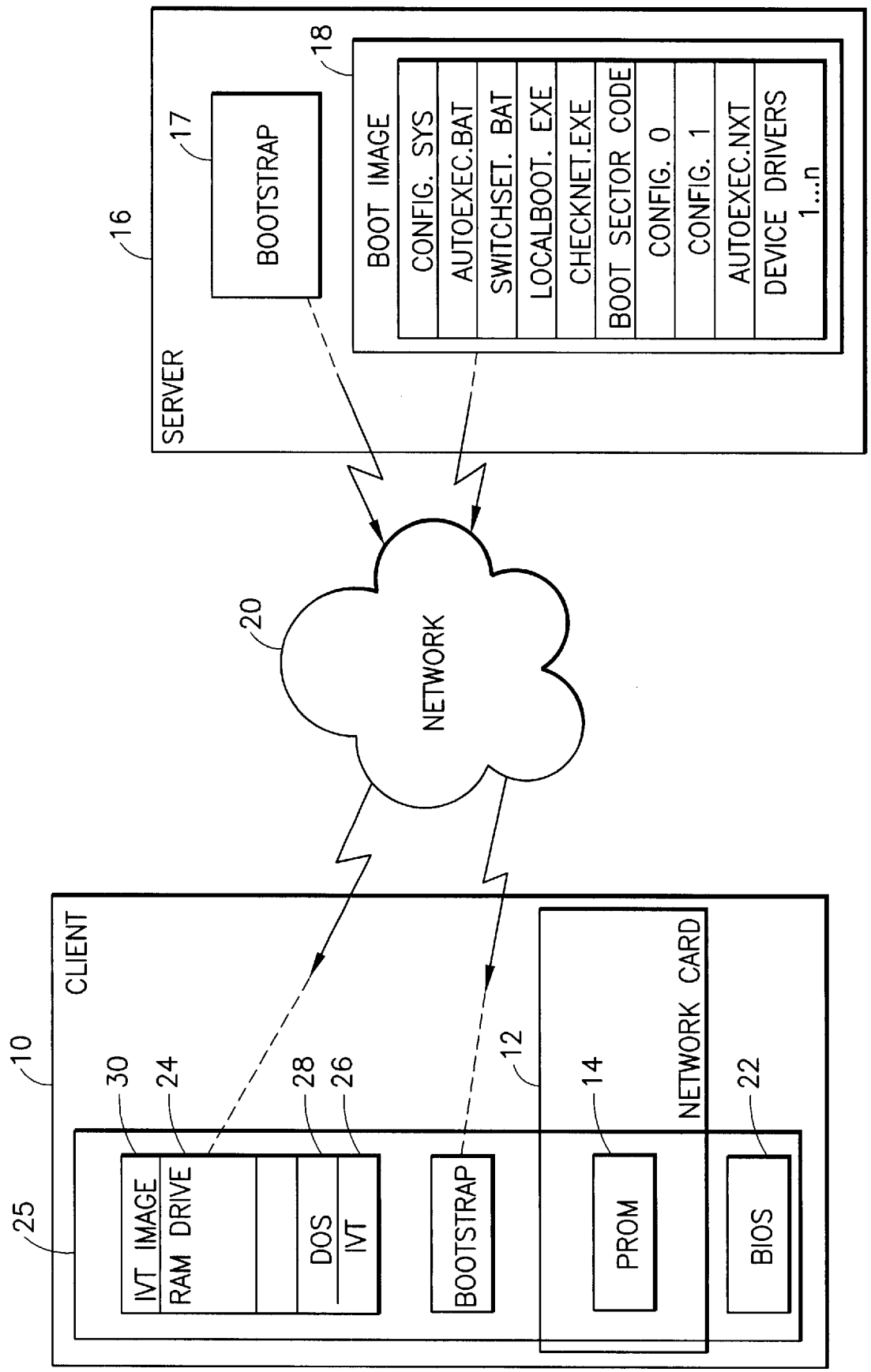
FIG. 1 is a schematic diagram of a network computer system including a host computer system and a client system according to a preferred embodiment of the invention.

In the present invention, as with conventional network booting, a client system 10 includes a network card 12 including a PROM 14 programmed to connect the client to a server 16 and to download a bootstrap program 17 from the server via the network 20. The bootstrap 17 in turn is programmed to download a boot image 18 from the server via the network 20. The PROM program runs immediately after a BIOS or initial bootstrap program 22 and before an operating system is loaded. In the case of the DOS operating system, the boot image includes a number of files, for example, autoexec.bat, config.sys and any other driver files necessary to boot the client.

In the present embodiment, the bootstrap 17 is programmed to set up a RAM drive 24 in memory 25 into which the boot image 18 files are transferred under the control of the PROM. The client may alternatively include a floppy disk drive (not shown) and the boot image 18 could be transferred onto the floppy disk avoiding the necessity for a RAM drive. This, however, would prove a slower and more cumbersome solution although not outside the scope of the present invention.

The DOS operating system employs an interrupt vector table (IVT) 26 which contains pointers to interrupt service routines normally located within the DOS portion 28 of memory. When DOS is loaded into memory, however, it affects the initial state of the interrupt vector table, pointing the IVT entries to the location of interrupt service routines in memory. If the client operating system is to be re-booted, then the state of the interrupt vector table before DOS is loaded needs to be preserved.

Figure 2:
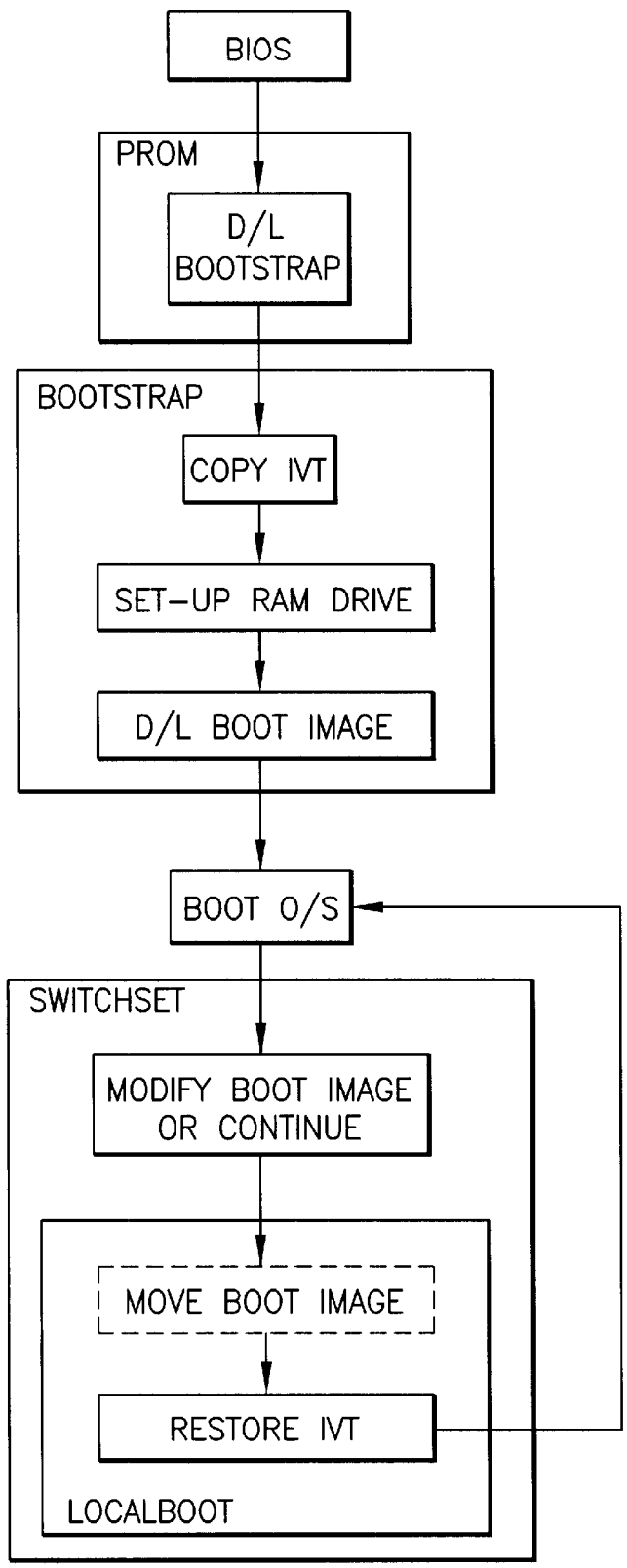
FIG. 2 is a flow diagram of the operation of the preferred embodiment.

Thus, in the present embodiment, the bootstrap program preserves the interrupt vector state by copying the interrupt vector table 26 contents located in memory at address 0 to 400h to a location 30 alongside the RAM drive 24 for the boot image. When DOS starts, the boot image is modified as required, FIG. 2. A program "localboot", explained later, then restores the interrupt vector state from the copy 30 in RAM, before returning to reboot from the boot image stored in the RAM drive 24.

The program 'localboot' first performs a memory copy of the interrupt vector table from the location in RAM where it has been stored back to location 0h, then performs a memory copy of the boot image boot sector code from the RAM drive to location 7c00h in memory, then passes control to the boot sector with a jump instruction to location 7c00h, emulating the standard boot process for a PC.

The boot image 18 is generic and is used for all clients and all tasks. In one example, the generic boot image contains a batch file, "Switchset.bat", started from "autoexec.bat", which, if required, modifies the image in the RAM drive 24 according to the requirements of the client configuration. In the example, 2 files, config.sys and protocol.ini, are modified before a second boot by copying different versions of batch file, corresponding to different types of network adapter, depending on the network card installed. "Switchset" then forces the client to reboot, with the command "localboot", from the modified boot image in the RAM drive.

In more detail, the original config.sys does not load any network device drivers, since the first boot is applicable to multiple network card types:

Config.sys
    DOS=HIGH,UMB
    FILES=30
    STACKS=9,216
    DEVICE=A:\DOS\HIMEM.SYS
    LASTDRIVE=Z In the present embodiment, the original autoexec.bat file just calls the Switchset batch file to do the work:

Autoexec.bat
    SWITCHSET

Switchset.bat, listed below, determines which of two network drivers is required based on a program, "Checknet", and sets up the appropriate config.sys and protocol.ini files for the required drivers. Switchset also copies autoexec.nxt to autoexec.bat to set up the process to be executed on the next boot, then runs "localboot" which restores the interrupt vector environment from memory and reboots from the modified copy of the operating system in the RAM drive 24.

Switchset.bat
    CALL CHECKNET
    IF ERRORLEVEL 1 GOTO TYPE1
    :TYPE0
    COPY CONFIG.0 CONFIG.SYS /Y
    COPY IBMNET\PROTOCOL.0 IBMNET\PROTOCOL.INI /Y
    GOTO REBOOT
    :TYPE1
    COPY CONFIG.1 CONFIG.SYS /Y
    COPY IBMNET\PROTOCOL.1 IBMNET\PROTOCOL.INI /Y :REBOOT
    COPY AUTOEXEC.NXT AUTOEXEC.BAT /Y
    localboot CONFIG.0 is a version of config.sys which loads a generic network adapter driver A:\DOS\NDIS.DOS and uses a utility PXUTIL.SYS to modify PROTOCOL.INI, NETWORK,INI and AUTOEXEC.BAT based on data passed in the network boot protocol- Config.0
    DOS=HIGH,UMB
    FILES=30
    STACKS=9,216
    DEVICE=A:\DOS\HIMEM.SYS
    LASTDRIVE=Z
    DEVICE=A:\IBMNET\PXPUTIL.SYS -a A:\IBMNET\PROTOCOL.INI
    DEVICE=A:\IBMNET\PXPUTIL.SYS -a A:\IBMNET\NETWORK.INI
    DEVICE=A:\IBMNET\PXPUTIL.SYS -y 3 -a A:\AUTOEXEC.BAT
    DEVICE=A:\IBMNET\PXPUTIL.SYS -a A:\AUTOEXEC.BAT
    DEVICE=A:\IBMNET\PROTMAN.DOS /I:A:\IBMNET
    DEVICE=A:\DOS\NDIS.DOS
    DEVICE=A:\IBMNET\NTSTS.DOS
    DEVICE=A:\IBMNET\DLSHELP.SYS CONFIG.1 is a version of config.sys which loads a specific network adapter driver A:\DOS\ENDS2ISA.DOS for a specific network card that does not support the generic adapter. The PXUTIL utility is replaced by another utility BPUTIL which works with the specific adapter.

Config.1
    DOS=HIGH,UMB
    FILES=30
    STACKS=9,216
    DEVICE=A:\DOS\HIMEM.SYS
    LASTDRIVE=Z
    DEVICE=A:\IBMNET\BPUTIL.SYS -a A:\IBMNET\PROTOCOL.INI
    DEVICE=A:\IBMNET\BPUTIL.SYS -a A:\IBMNET\NETWORK.INI
    DEVICE=A:\IBMNET\BPUTIL.SYS -y 3 -a A:\AUTOEXEC.BAT
    DEVICE=A:\IBMNET\BPUTIL.SYS -a A:\AUTOEXEC.BAT
    DEVICE=A:\IBMNET\PROTMAN.DOS /I:A:\IBMNET
    DEVICE=A:\DOS\ENDS2ISA.DOS
    DEVICE=A:\IBMNET\NTSTS.DOS
    DEVICE=A:\IBMNET\DLSHELP.SYS PROTOCOL.0 and PROTOCOL.1 contain corresponding variations in the network configuration.

After switchset calls localboot and the interrupt vector table 30 has been restored, the client can be re-booted. On the second boot, either config.0 or config.1, now config.sys, is loaded and the previous autoexec.nxt, now autoexec.bat, shown below, connects to the networked server 16 which is now accessible since the correct network drivers have been installed.

\IBMNET\net logon %CLIENT_NAME% /pwcaching:no
autoexec.nxt
    \ibmnet\net use s: \\#@t128*#########\lanc$$
    \ibmnet\net use t: \\#@t128*#########\lccm$tmp
    s:\_lccmD.bat The batch file_LCCMD.BAT, called from autoexec.bat, resides on the server and contains instructions for executing the specific task required. Based on these instructions, the server 16 may further modify the boot image in the RAM drive 24 to support the required task, for example by modifying the config.sys file to load or not load EMM386 on the next boot, and boot again by calling "localboot".

This sequence may be repeated an arbitrary number of times to perform a sequence of processes without ever rebooting from the network, or requiring the server to modify the generic boot image stored on the server.

A problem with the RAM drive embodiment of a network boot is that when the PROM 14 program loads the bootable image 18 into the RAM drive 24, it must choose a fixed location in memory to locate the RAM drive, or calculate a location without any awareness of the task that is to be performed. Some tasks may also need to use the same fixed location, overwriting and corrupting the boot image. For example, a program to upgrade the client systems's BIOS code 22 in flash memory may assume that no other program is running and choose an arbitrary area in memory to store its data. In this case, the generic boot image may both modify itself and copy itself to a different part of RAM before rebooting. Conventional programs are available to achieve this, or localboot can be adapted to perform a byte-for-byte memory copy from the current location of the bootable image in RAM to another location.

It will be seen that in a variation of the present embodiment, the operating system image 18 could be divided into a generic portion and one or more optional portions. The generic portion could be downloaded first and one of the or each optional portions could be downloaded, if necessary, after a second or subsequent boot of the operating system. It will be seen, however, that in any case it is not necessary to download the generic portion of the operating system more than once.

What is claimed is:

1. A client computer system adapted to connect to a server across a network, the client system including memory into which an operating system is loadable and being adapted to load at least a portion of an operating system image over the network from the server into a location in said memory and to boot from the operating system image in memory, wherein said client system is adapted to subsequently modify the operating system image in memory without reloading the portion of the operating system image over the network and to re-boot the client system from the modified operating system image in memory also without reloading the portion of the operating system image over the network.

2. A client system as claimed in claim 1 wherein the client system is adapted to modify said location of the operating system image in memory before rebooting.

3. A client system as claimed in claim 1 wherein the client system is adapted to modify said operating system image and reboot several times for complex sequences of functions requiring different operating system images.

4. A client system as claimed in claim 1, said system including a network card, said network card including a programmed memory operable to download a bootstrap program from said server.

5. A client system as claimed in claim 4, wherein said bootstrap program is operable to set up a virtual drive in memory and to load said operating system image into said virtual drive over the network.

6. A client system as claimed in claim 5 wherein said operating system is the DOS operating system, and said operating system image includes a plurality of files, said files including one or more of an autoexec.bat, a config.sys and a device driver file.

7. A client system as claimed in claim 6 in which said bootstrap program is operable to form a duplicate of the contents of a DOS interrupt vector table, prior to starting DOS.

8. A client system as claimed in claim 7 in which said operating system image includes a program operable to restore the contents of the DOS interrupt vector table from said duplicate, prior to re-starting DOS.

9. A client system as claimed in claim 8 wherein said program is operable to relocate said operating system image in memory.

10. A client system as claimed in claim 1 wherein said operating system image is downloaded into volatile memory.

11. A client system as claimed in claim 1 comprising a storage medium and wherein said operating system image is downloaded onto said storage medium.

12. A method of booting a computer in a network said method including the steps of:
   a. downloading at least a portion of an operating system image from a network server to the memory of the computer;
   b. booting the computer from the operating system image in the memory of the computer;
   c. modifying the operating system image in the memory of the computer; and
   d. rebooting the computer from the modified operating system without downloading the operating system image again from the network server.

13. A method of booting a computer as claimed in claim 12 comprising the steps of downloading a bootstrap program from a network server, said bootstrap program being operable to download said operating system image from the network server.

14. An operating system image for a client computer system including a network card operable to connect said client system to a server across a network, said operating system image being embodied in a computer readable medium and being operable to boot said client system, to modify itself after being booted and to re-boot said client system to connect said client system to said server.

15. An operating system image embodied in a computer readable medium as claimed in claim 14 comprising a plurality of DOS operating system files, said files including a program adapted to check the state of said client system and to modify one or more of a config.sys and/or an autoexec.bat file accordingly.

16. An operating system image embodied in a computer readable medium as claimed in claim 15, said files comprising a program adapted to re-boot said client system.

* * * * *